United States Patent [19]

Junghans

[11] Patent Number: 5,415,097
[45] Date of Patent: May 16, 1995

[54] DEVICE FOR TRANSMITTING TENSIONING FORCES TO PRINTING-UNIT CYLINDERS

[75] Inventor: Rudi Junghans, Wilhelmsfeld, Germany

[73] Assignee: Heidelberger Druckmaschinen AG, Heidelberg, Germany

[21] Appl. No.: 82,593

[22] Filed: Jun. 25, 1993

[30] Foreign Application Priority Data

Jun. 27, 1992 [DE] Germany .................. 42 21 133.6

[51] Int. Cl.⁶ .............................. B41F 1/28
[52] U.S. Cl. .................... 101/415.1; 101/378
[58] Field of Search ............. 101/378, 380, 381, 386, 101/388, 415.1; 403/333; 285/330; 464/112, 113, 157, 158

[56] References Cited

U.S. PATENT DOCUMENTS

| | | | |
|---|---|---|---|
| 2,466,097 | 4/1949 | Graue | 464/113 |
| 2,850,970 | 9/1958 | Brodie | 101/415.1 |
| 3,249,377 | 5/1966 | Weasler | 287/103 |
| 3,290,918 | 12/1966 | Weasler | 72/340 |
| 3,913,480 | 10/1975 | Dauner et al. | 101/378 |
| 4,083,303 | 4/1978 | McInerny | 101/378 |
| 4,587,901 | 5/1986 | Gianfranco | 101/415.1 |

FOREIGN PATENT DOCUMENTS

| | | |
|---|---|---|
| 1075635 | 9/1960 | Germany . |
| 618534 | 2/1948 | United Kingdom . |
| 1140513 | 1/1969 | United Kingdom . |

Primary Examiner—Ren Yan
Attorney, Agent, or Firm—Herbert L. Lerner; Laurence A. Greenberg

[57] ABSTRACT

Device for transmitting tensioning forces to a printing-unit cylinder carrying at least one areal flexible packing thereon, the cylinder being formed with an opening extending therethrough in axial direction thereof, and at least one of a leading and trailing edge of the one packing being received in the opening, includes a tensioning shaft disposed in the opening and engageable with the respective one edge of the packing for applying a tensioning force thereto, the tensioning shaft being formed with a journal pin, and an exchangeable adjusting wheel having a bore formed therein wherein at least part of the journal pin of the tensioning shaft is received, the bore having a defining peripheral surface carrying a plurality of supporting bodies thereon, the journal pin of the tensioning shaft being formed at an outer peripheral surface thereof with a plurality of corresponding recesses wherein the supporting bodies, respectively, engage.

9 Claims, 3 Drawing Sheets

DEVICE FOR TRANSMITTING TENSIONING FORCES TO PRINTING-UNIT CYLINDERS

BACKGROUND OF THE INVENTION

1. Field of the Invention

The invention relates to a device for transmitting tensioning forces to printing-unit cylinders, especially in rotary printing presses having printing-unit cylinders carrying or guiding areal, i.e., primarily two-dimensional, flexible dressings or packings.

2. Description of the Related Art

In German Patent 1 279 689 representing the state of the art, a device is disclosed for locking a tensioning rod of a roller packing or covering, more particularly, an impression-cylinder packing of a letterpress. A switch provided on the tensioning rod has a pawl or latch rotatable about a pin. The latch, which has a spring force applied thereto, engages in a control wheel which determines the position of the tensioning rod which applies tension to or releases tension in a deposit or covering on a printing-unit body. The value or level of the holding momemt which this heretofore known device can transmit or maintain is limited, however.

German Patent 10 75 635 discloses a device for tensioning the packing on impression cylinders. A worm gear is fastened to a tensioning rod at an end face of an impression cylinder, and cooperates with a screw or worm mounted in a housing.

The worm gear is thus seated on the tensioning rod which accommodates both a front or leading edge and a rear or trailing edge of the packing or covering. The device of this German patent does not exhibit any feature which offers exchangeability of the worm wheel.

It is accordingly an object of the invention to provide a device for optimally transmitting tensioning forces to printing-unit cylinders so that high turning moments or torques are transmissible, and disassembly with minimal space requirement is realizable.

SUMMARY OF THE INVENTION

With the foregoing and other objects in view, there is provided, in accordance with the invention, a device for transmitting tensioning forces to a printing-unit cylinder carrying at least one areal flexible packing thereon, the cylinder being formed with an opening extending therethrough in axial direction thereof, and at least one of a leading and trailing edge of the one packing being received in the opening, comprising a tensioning shaft disposed in the opening and engageable with the respective one edge of the packing for applying a tensioning force thereto, the tensioning shaft being formed with a journal pin, and an exchangeable adjusting wheel having a bore formed therein wherein at least part of the journal pin of the tensioning shaft is received, the bore having a defining peripheral surface carrying a plurality of supporting bodies thereon, the journal pin of the tensioning shaft being formed at an outer peripheral surface thereof with a plurality of corresponding recesses wherein the supporting bodies, respectively, engage.

The advantage attainable with the foregoing construction of the device according to the invention is that, in confined space relationships, an exchange of the adjusting wheel is possible by pulling it off the journal pin of the tensioning shaft. Furthermore, this coupling or connection between the adjusting wheel as an outer part and the journal pin of the tensioning shaft as an inner part can be produced relatively simply and inexpensively, and enables high torques to be transmitted, and thereby assures the tensioning of the cylinder packing by means of a plurality of supporting bodies. Moreover, due to the application of a plurality of, i.e., several, supporting bodies, a very high redundancy is provided which increases the operational reliability of the device according to the invention.

In accordance with another feature of the invention, respective recesses of pairs of the plurality thereof are disposed diametrically opposite one another on the outer peripheral surface of the journal pin, each of the recesses of the pairs thereof, respectively, having like dimensions.

Thus, the arrangement of the recesses is symmetrical with respect to an axis of symmetry coincident with the longitudinal axis of the journal pin and the tensioning shaft. The assembly position of the adjusting wheel on the journal pin is thereby fixed.

Furthermore, in accordance with a further feature of the invention, the defining peripheral surface of the bore formed in the exchangeable adjusting wheel is formed with a plurality of receiving openings wherein the plurality of supporting bodies, respectively, are received, the receiving openings extending to an end face of the exchangeable adjusting wheel located at the journal pin of the tensioning shaft. An adequate force-transmission surface area is thereby available without any disadvantageous influences being exerted upon the service life or durability of the components by shear stresses and Hertzian compressions; the mechanical component stresses are clearly reduced.

In accordance with an added feature of the invention, the supporting bodies are formed as cylindrical pins.

In accordance with an additional feature of the invention, the supporting bodies are formed as cylindrical pins, respectively, secured by adhesive in the receiving openings formed in the exchangeable adjusting wheel, which affords simpler handling during assembly and disassembly.

In accordance with an alternative feature of the invention, the supporting bodies are formed as adjusting springs.

In accordance with yet a further feature of the invention, the journal pin of the tensioning shaft has an end formed as a multi-splined shaft.

In accordance with yet an added feature of the invention, a bearing part is secured to the printing-unit cylinder, and the exchangeable adjusting wheel is mounted in the bearing part.

In accordance with a concomitant feature of the invention, a shaped part and a pointer fastened to an end of the journal pin are provided for indicating an application and tensioning position of the exchangeable adjusting wheel.

Other features which are considered as characteristic for the invention are set forth in the appended claims.

Although the invention is illustrated and described herein as embodied in a device for transmitting tensioning forces to printing-unit cylinders, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the

DESCRIPTION OF THE RELATED ART

Figure 1:
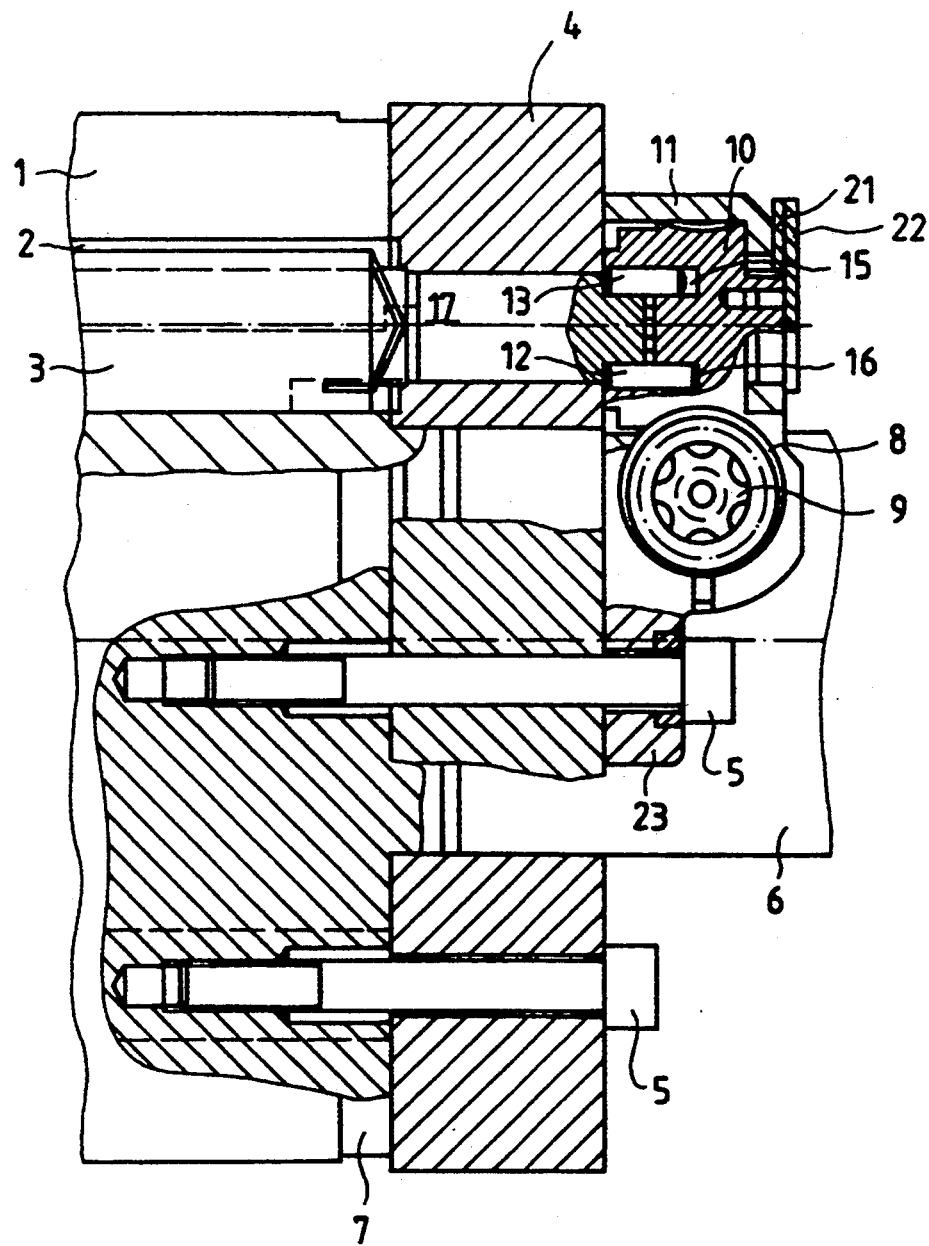
FIG. 1 is a fragmentary longitudinal sectional view of a printing-unit cylinder at an end region thereof incorporating the tensioning-force transmitting device according to the invention.

Referring now to the drawings and, first, particularly to FIG. 1 thereof, there is shown therein, in a longitudinal sectional view, an end region of a printing-unit cylinder 1. An axial bore 2 is formed in the cylinder 1 of the printing unit, and a tensioning shaft 3 is received therein. Both leading and trailing edges of a packing or covering which is tautened over the outer cylindrical or jacket surface of the cylinder 1 are accommodated or held in the tensioning shaft 3. A so-called Schmitz or bearer ring 4 is fastened by screws or bolts 5 to an end face of the cylinder 1, one of the screws 5 serving simultaneously to fix a bearing part 23 to the cylinder 1. Between the bearer ring 4 and the surface of the cylinder 1 covered by the packing is a recessed step or shoulder 7. A worm 8 is carried by the bearing part 23, and is turnable by a projection member 9 which, as shown in FIG. 1, may be constructed as a multi-spline profile member; however, a screwhead with several flats formed tangentially thereon or a similar form-locking actuating element may be used instead. The worm 8 meshes with an exchangeable adjusting wheel 10 formed as a worm wheel, which is mounted in a housing 11 of the bearing part 23. Receiving openings 15 and 16 are formed at the periphery of a bore in the exchangeable adjusting wheel 10, in a region thereof located opposite from a journal pin 17 of the tensioning shaft 3. Supporting bodies 12 and 13 having varying dimensions engage in these receiving openings 15 and 16. The supporting bodies 12 and 13 may be formed, for example, as cylindrical pins or needles, and are secured by adhesive in the receiving openings 15 and 16 at the bore formed in the exchangeable adjusting wheel 10. The supporting bodies 12 and 13 also engage simultaneously in recesses 18 and 19 formed in the journal pin 17 of the tensioning shaft 3 and, thereby, provide a form-locking connection between the exchangeable adjusting wheel 10 and the journal pin 17 of the tensioning shaft 3.

As is furthermore readily apparent from FIG. 1, respective halves, approximately, of the supporting bodies 12 and 13 are received, on the one hand, in the receiving openings 15 and 16 of the exchangeable adjusting wheel 10 and, on the other hand, in the recesses 18 and 19 formed at the periphery of the journal pin 17 of the tensioning shaft 3. An axial displacement of only a few millimeters is therefore required for disassembly of the device, which represents a considerable simplification thereof. In addition to the relatively simple disassembly which is afforded, maintenance of an adjustment made only once is provided due to the self-locking capability of the worm drive. Due to the fact that a plurality of supporting bodies 12 and 13 are received between the exchangeable adjusting wheel 10 and the journal pin 17, large forces for tensioning may be transmitted and maintained. When the worm 8 is turned by a suitable tool engaging the projection member 9, the exchangeable adjusting wheel 10 and the journal pin 17 therewith are also turned. A force flux takes place from the exchangeable adjusting wheel 10 via the supporting bodies 12 and 13 secured by adhesive in the receiving openings 15 and 16 and engaging in the recesses 18 and 19 at the periphery of the journal pin 17 and forcing the tensioning shaft 3 into turning.

Figure 2:
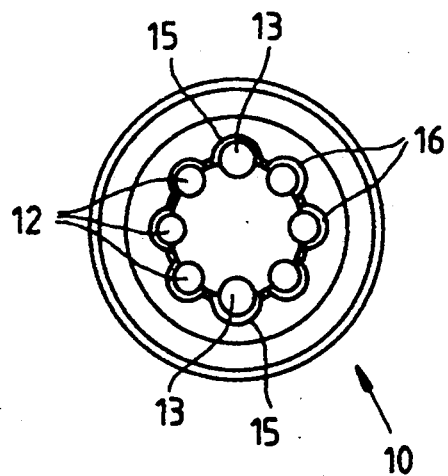
FIG. 2 is an end view of an adjusting wheel and a journal pin of a tensioning shaft in a form-locking connection in accordance with the invention, a form-locking connection being one which connects two elements together due to the shape of the elements themselves, as opposed to a force-locking connection, which locks the elements together by force external to the element.

FIG. 2 shows a form-locking connection of an adjusting wheel and a journal pin of a tensioning shaft. Of the supporting bodies 12 and 13 secured by adhesive in the receiving openings 15 and 16 formed at the periphery of the central bore in the exchangeable adjusting wheel 10, two diametrically opposing supporting bodies 13 secured by adhesive in the receiving openings 15 are of thicker construction than the other supporting bodies 12 disposed therebetween. In the illustrated embodiment of the invention, the supporting bodies 12 and 13 are formed as cylindrical pins of various diameters. The supporting bodies 13 of greater diameter serve to fix the adjusting wheel 10 on the tensioning shaft 3. With such supporting bodies 13 of greater diameter offset 180 degrees from one another, a mirror-image type of assembly of the adjusting wheel 10 is possible. It is, of course, also conceivable, in this regard, to provide a suitable number of the supporting bodies 13 arranged offset 60 or 90 degrees from one another. Due to the engagement of the supporting bodies 12 and 13 in the recesses 18 and 19 formed in the journal pin 17, the tensioning force is introduced into the tensioning shaft 3 by the rotation of the worm 8 as a result of the turning of the adjusting wheel 10.

Figure 3:
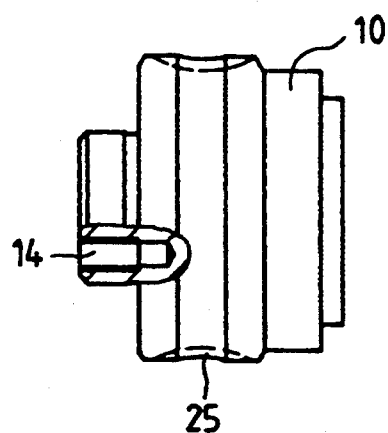
FIG. 3 is a side elevational view of FIG. 2.

FIG. 3 is a side view of the exchangeable adjusting wheel 3 of FIG. 2. Toothing 25 represented by broken lines is formed on the adjusting wheel 3 so that the latter can be turned, and self-locking via the worm 8 can take place. Screw threads 14 are formed in a reduced-diameter part of the exchangeable adjusting wheel 10 and serve for fastening a pointer or indicator needle 21 (FIG. 1) thereon by means of a non-illustrated screw, for example. It is likewise apparent from FIG. 1, that the pointer 21 cooperates with a shaped part 22. From the position or setting of the pointer 21 relative to the shaped part 22, it is possible to read the position of the tensioning shaft 3 for receiving a packing or covering or the tensioning position of the tensioning shafts, if a plurality thereof are provided, for a corresponding setting of the pointer 21.

Figure 4:
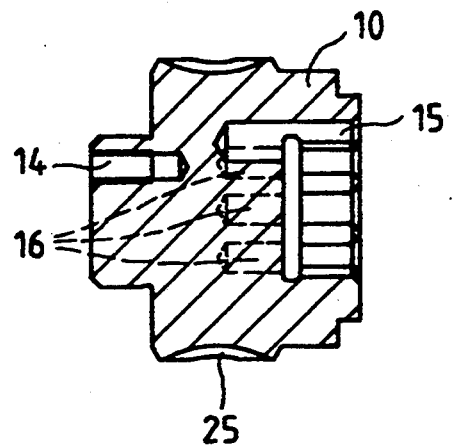
FIG. 4 is a longitudinal sectional view of FIG. 3.

In the longitudinal sectional view of the exchangeable adjusting wheel 10 shown in FIG. 4, the bore formed therein for receiving the journal pin 17 of the tensioning shaft 3 is visible, in addition to one of the aforementioned screw threads for fastening the pointer 21. At the periphery of the bore for receiving the journal pin 17 therein, the receiving opening 15 for one of the increased-diameter or widened supporting bodies 13, and also several of the other receiving openings 16, wherein the narrower or reduced-diameter supporting bodies 12 are adhesively secured, are shown. To attain a shortest possible lateral decoupling path, the length of the supporting bodies 12 and 13 which is selected is such that the supporting bodies 12 and 13 are adhesively secured flush with the end face of the exchangeable adjusting wheel 10 in the bore formed in the latter. The journal pin 17 introduced into the central bore formed in the exchangeable adjusting wheel 10 is thereby already free after a lateral movement of only a few millimeters by the exchangeable adjusting wheel 10. In possible applications of the principles upon which the invention of the instant application is based wherein the length of the decoupling path is of secondary importance, the inserted supporting bodies 12 and 13, respectively, can by all means have a more elongated construction.

The recesses 18 and 19 formed at the periphery of the journal pin 17 should be matched in length to the length of the respective supporting bodies 12 and 13 if criteria such as the force to be transmitted and the radial fixation of the connected components are in the foreground.

Figure 5:
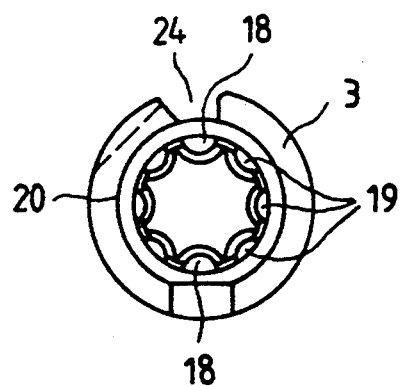
FIG. 5 is an end view of a journal pin of a tensioning shaft.

FIG. 5 is an end view of the journal pin 17 of the tensioning shaft 3. Diametrically opposing recesses 18 are formed in the outer cylindrical surface of the journal pin 17 of the tensioning shaft 3 and receive therein, respectively, the greater-diameter or thicker supporting bodies 13. Correspondingly, during assembly of the outer connecting part, i.e., the exchangeable adjusting wheel 10, the supporting bodies 12 fastened therein engage in the recesses 19 formed in the journal pin 17. Behind the splined journal pin 17 is an extension 20 to which a section of the tensioning shaft 3 is connected wherein the ends of a cylinder packing are received.

Figure 6:
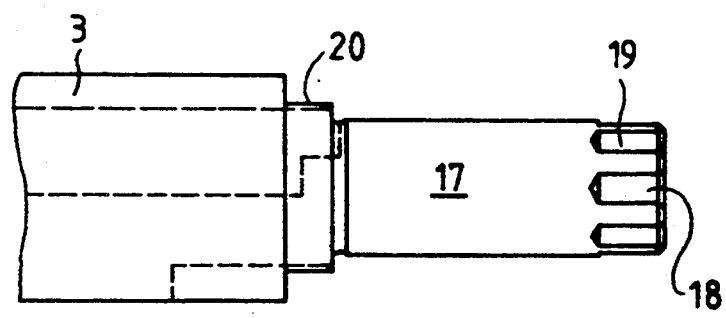
FIG. 6 is a side elevational view of FIG. 5 showing the tensioning shaft and the journal pin thereof.

FIG. 6 is a fragmentary side view of the tensioning shaft 3 and the journal pin 17. As shown in this figure, the recesses 18 and 19 can, by all means, be expanded in the longitudinal extension thereof over the entire length of the journal pin 17 of the tensioning shaft 3, in order to receive therein longer supporting bodies 12 and 13, respectively.

I claim:

1. Device for transmitting tensioning forces to a printing-unit cylinder carrying at least one areal flexible packing thereon, the cylinder being formed with an opening extending therethrough in axial direction thereof, at least one of a leading and trailing edge of the one packing being received in the opening, comprising a tensioning shaft disposed in the opening and engageable with the respective one edge of the packing for applying a tensioning force thereto, said tensioning shaft being formed with a journal pin, and an exchangeable adjusting wheel having a bore formed therein wherein at least part of said journal pin of said tensioning shaft is received, said bore having a defining peripheral surface with receiving openings carrying a plurality of supporting bodies thereon, said journal pin of said tensioning shaft being formed at an outer peripheral surface thereof with a plurality of corresponding recesses wherein said supporting bodies, respectively, engage, portions of said supporting bodies being received in the receiving openings in the bore of the exchangeable adjusting wheel, and other portions of said supporting bodies being received in the recesses formed in the peripheral surface of said journal pin of said tensioning shaft.

2. Device according to claim 1, wherein respective recesses of pairs of said plurality thereof are disposed diametrically opposite one another on said outer peripheral surface of said journal pin, each of the recesses of said pairs thereof, respectively, having like dimensions.

3. Device according to claim 1, wherein said receiving openings extend to an end face of said exchangeable adjusting wheel located at said journal pin of said tensioning shaft.

4. Device according to claim 3, wherein said supporting bodies are formed as cylindrical pins, respectively, secured by adhesive in said receiving openings formed in said exchangeable adjusting wheel.

5. Device according to claim 1, wherein said supporting bodies are formed as cylindrical pins.

6. Device according to claim 1, wherein said journal pin of said tensioning shaft has an end formed as a multi-splined shaft.

7. Device according to claim 1, including a bearing part secured to the printing-unit cylinder, said exchangeable adjusting wheel being mounted in said bearing part.

8. Device according to claim 1, including a shaped part and a pointer fastened to an end of said journal pin for indicating an application and tensioning position of said exchangeable adjusting wheel.

9. Device according to claim 1, wherein said supporting bodies are first and second supporting bodies, and said first supporting bodies have a size dimension different from said second supporting bodies.

* * * * *